(12) United States Patent
Todderud

(10) Patent No.: US 12,727,544 B2
(45) Date of Patent: Sep. 8, 2026

(54) CHOPPER KNIFE LOSS DETECTION SYSTEM FOR AGRICULTURAL VEHICLE

(71) Applicant: CNH Industrial America LLC, New Holland, PA (US)

(72) Inventor: Stephen Todderud, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 386 days.

(21) Appl. No.: 18/373,550

(22) Filed: Sep. 27, 2023

(65) Prior Publication Data

US 2025/0098578 A1 Mar. 27, 2025

(51) Int. Cl.
*A01D 75/18* (2006.01)
*A01D 41/127* (2006.01)
*G01V 3/02* (2006.01)

(52) U.S. Cl.
CPC ........... *A01D 75/18* (2013.01); *A01D 41/127* (2013.01); *G01V 3/02* (2013.01)

(58) Field of Classification Search
CPC ... A01D 41/1243; A01D 41/127; H02J 50/60; H02J 50/00
See application file for complete search history.

(56) References Cited

U.S. PATENT DOCUMENTS

| | | | |
|---|---|---|---|
| 5,521,514 A | 5/1996 | Nelson et al. | |
| 5,826,903 A * | 10/1998 | Schiller | B60R 21/0136 280/735 |
| 6,607,212 B1 * | 8/2003 | Reimer | B60R 21/0136 180/274 |
| 7,445,073 B2 * | 11/2008 | Munch | B60R 21/0136 180/274 |
| 7,973,654 B2 | 7/2011 | Ehrhart et al. | |
| 10,314,232 B2 | 6/2019 | Isaac et al. | |
| 11,134,609 B2 | 10/2021 | Willgert et al. | |
| 2004/0159074 A1 * | 8/2004 | McClure | A01F 15/0715 53/118 |
| 2011/0113743 A1 * | 5/2011 | Straeter | A01D 43/081 56/60 |

FOREIGN PATENT DOCUMENTS

DE 102011117258 A1 5/2013

* cited by examiner

*Primary Examiner* — Joseph M Rocca
*Assistant Examiner* — Rohan Om Patel
(74) *Attorney, Agent, or Firm* — Buchanan Ingersoll & Rooney PC

(57) ABSTRACT

A protective plate assembly for use with an agricultural vehicle. The protective plate assembly includes a first plate that is composed of a conductive material and that is configured to protect a component of the agricultural vehicle from being struck by a foreign object; a second plate that is composed of a conductive material and that is configured to protect the component of the agricultural vehicle from being struck by the foreign object; and an insulator that is positioned between the first and second plates.

12 Claims, 2 Drawing Sheets

CHOPPER KNIFE LOSS DETECTION SYSTEM FOR AGRICULTURAL VEHICLE

FIELD OF THE INVENTION

The present invention relates to agricultural vehicles. More specifically, the present invention relates to a chopper knife loss detection system for an agricultural vehicle, such as a combine harvester.

BACKGROUND OF THE INVENTION

As is described in U.S. Pat. No. 10,314,232 to CNH America LLC (the '232 Patent), which is incorporated by reference in its entirety and for all purposes, an agricultural harvester known as a "combine" is historically termed such because it combines multiple harvesting functions with a single harvesting unit, such as picking, threshing, separating and cleaning. The separating system of the combine directs the non-grain material to a residue system. The residue system distributes the non-grain material through a chopper, a spreader, and/or a windrow chute before it is distributed onto the field.

The residue system is typically integrated in the rear of harvester. Residue handling system can generally comprise a straw hood defining an interior space; and a discharge beater, seed mills, a chopper, and spreaders that are all at least partially positioned within straw hood. The choppers, spreaders, beaters and mills can include rotors that rotate, reciprocate, or otherwise move, at high speeds. The knifes or blades on those rotors could conceivably shear, break or become disconnected. The engine compartment is typically positioned in the vicinity of the aforementioned rotors. To prevent and monitor potential damage to the engine compartment, described herein is a protection plate assembly that both shields the engine compartment from dislodged knives and detects the presence of a knife that has become lodged in the protection plate assembly.

SUMMARY OF THE INVENTION

According to one aspect of the invention, a protective plate assembly for use with an agricultural vehicle is disclosed. The protective plate assembly includes a first plate that is composed of a conductive material and that is configured to protect a component of the agricultural vehicle from being struck by a foreign object; a second plate that is composed of a conductive material and that is also configured to protect the component of the agricultural vehicle from being struck by the foreign object; and an insulator that is positioned between the first and second plates.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
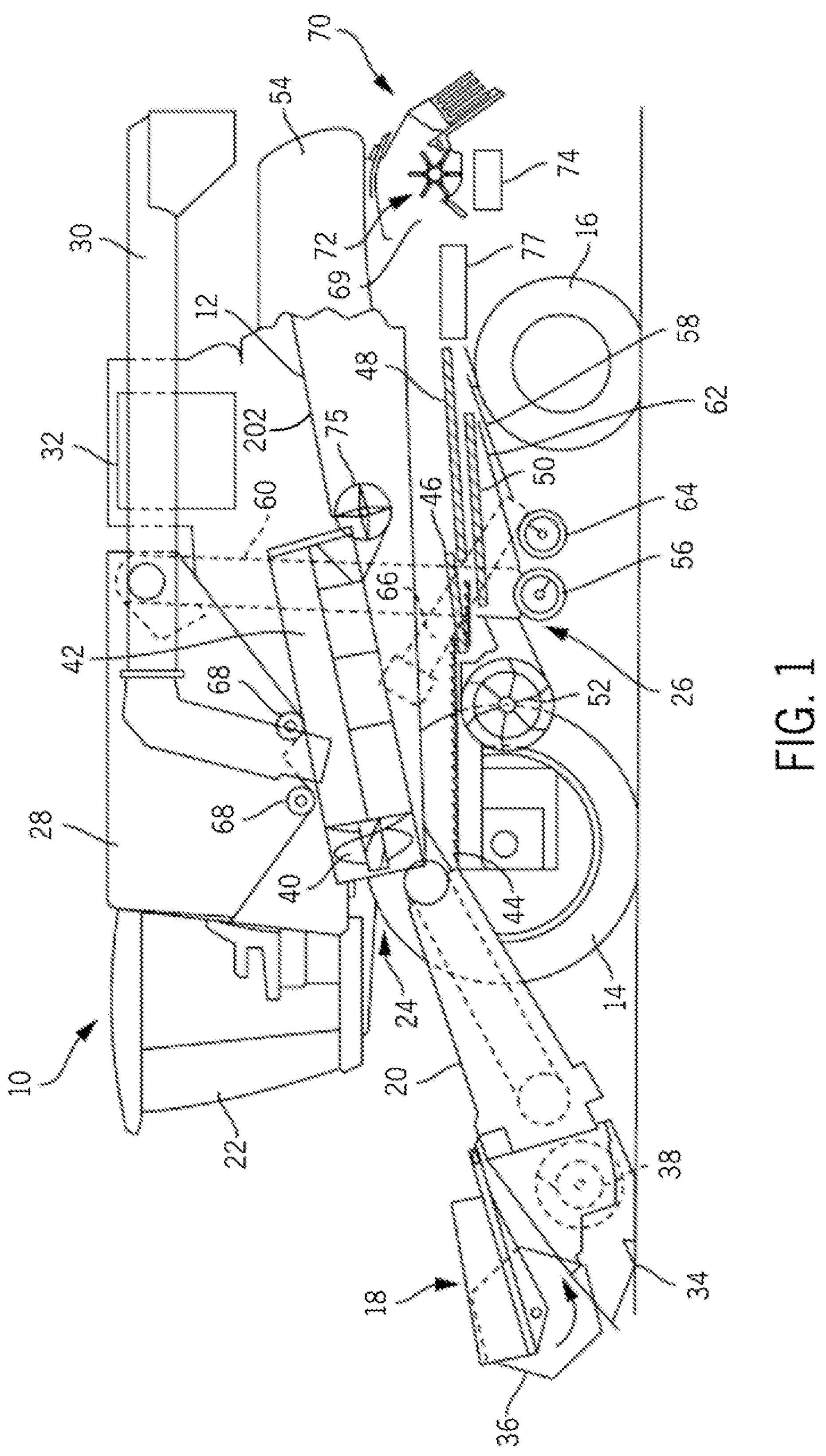
FIG. 1 is a side view of an embodiment of an agricultural harvester in the form of a combine illustrating the residue handling system of the present invention in a cutout view toward the rear of the harvester.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14 through a power plant in the form of a diesel engine 32 and a transmission (not shown). The engine 32 may have an oil pan, for example, on its lower end. The details of the engine can vary greatly. For example, the engine could be an electric motor. The engine 32 is shown schematically, and it should be understood that its size and position can vary greatly.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

A residue handling system 70 is integrated in the rear of harvester 10. Residue handling system 70 generally comprises a straw hood 54, a discharge beater 75, seed mills 77, a chopper 72, and horizontally oriented spreaders 74, some or all of which are at least partially positioned within straw hood 54.

Discharge beater 75 is configured to deliver a stream of straw material into the upper end of passageway 69 towards chopper 72. Chopper 72 is configured to rotate and chop the straw material and deliver it to spreader 74. The spreader 74 discharges the non-grain crop material across the harvested width behind harvester 10. Further details of discharge beater 75, chopper 72 and spreader 74 are provided in the '232 Patent.

Seed mills 77 are (optionally) positioned at the bottom side of straw hood 54. Each seed mill 77 receives a stream of chaff from the cleaning system 26 via passageway 69. Further details in connection with seed mills 77 are described in U.S. Pat. No. 10,004,176, which is incorporated by reference in its entirety.

Although a rotary combine has been described thus far, it should be understood that the details presented herein are not limited to rotary combine and may be applicable to other machines, such as conventional combines and cross harvester combines.

As shown in FIG. 1, a protective plate assembly 202 (hereinafter, plate assembly 202) is positioned directly between beater 75 and engine 32. The shape and position of plate assembly 202 may vary such that plate assembly 202 is positioned directly between engine 32 and one or more of seed mill 77, spreader 74 and chopper 72 (as well as any other moving component having knives/blades). Also, plate assembly 202 may be positioned between those moving components having knives/blades and another critical component of combine 10, such as a oil reservoir, grain tank, grain receiving area, radiator, fuel tank, computer, fluid line, etc. Plate assembly 202 forms part of a protective system 200, which will be described in greater detail with reference to FIG. 2.

Figure 2:
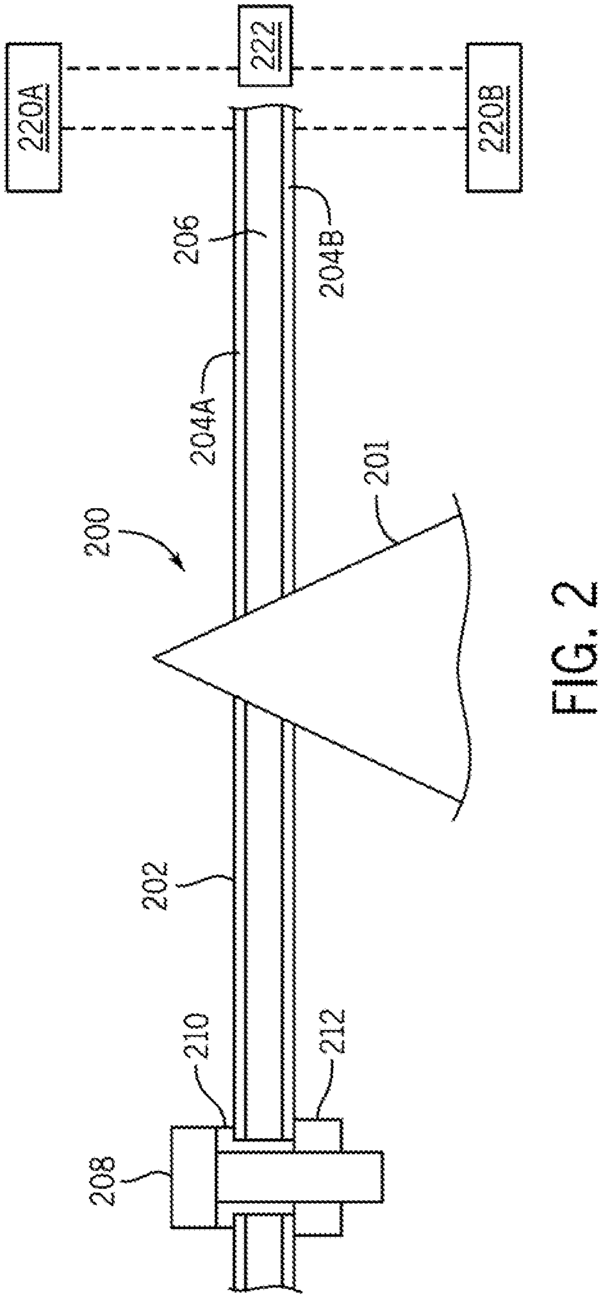
FIG. 2 is a schematic cross-sectional side elevation of a protection plate system for use with the harvester of FIG. 1, and a broken knife embedded in a multi-layer plate assembly of the system. Electrical signals lines are shown in broken lines.

Turning now to FIG. 2, protective system 200 generally comprises the multi-layer plate assembly 202 having a first protective plate (or layer) 204A, a second protective plate (or layer) 204B and an insulator 206 sandwiched between plates 204A and 204B; a first continuity sensor 220A electrically connected to plate 204A; a second continuity sensor 220B electrically connected to plate 204B; and a computer processor/controller 222 that is electrically connected to sensors 220A and 220B for receiving signals therefrom. In FIG. 2, a broken knife 201 (or other foreign object) is shown embedded through all of the layers of plate assembly 202. It should be understood that knife 201 may be a knife that has become dislodged from any one of beater 75, seed mill 77, spreader 74, chopper 72 or any other moving component of combine 10 having knives/blades.

Plates 204A and 204B are electrically isolated from one another by insulator 206. The layers of plate assembly 202 may be connected together by a bolt 208, for example. Bolt 208 is positioned through an electrically insulative spacer 210, which is positioned through co-aligned holes in each layer of plate assembly 202. It should be understood that bolt 208 does not electrically connect the plates 204A and 204B. A retaining nut 212, which may be a lock nut, secures the bolt 208 to assembly 202. Other means for connecting together the layers of plate assembly 202 are envisioned, such as clips, clamps, welds, hooks, mating surfaces, adhesive (conductive or non-conductive), fasteners and so forth. Alternatively, plate assembly 202 may be a co-molded component.

Plates 204A and 204B may be composed of a material that is sufficiently robust so as to protect the engine 32 by either limiting or preventing the passage of the knife 201 through the entirety of plate assembly 202. By way of non-limiting example, each plate 204A and 204B may be composed of mild steel, for example, having a thickness of between 3-4 millimeters. Each plate may have, for example, a Brinell hardness of 80-150, a density of 7-9 gm/m^3, and an electrical conductivity of 1-9×10^7 (S/m). Insulator 206 may comprise an electrically insulative sheet of material composed of DELRIN® or plastic, for example. Insulator 206 could also be composed of a foam material having a resistance to heat of up to 422K-477K, for example. Also, plate assembly 202 may weigh a total of 10-40 kilograms, for example, for user handling purposes.

In operation, when a knife 201 becomes detached from its rotor and embeds within the plate assembly 202 (as shown in FIG. 2), continuity sensors 220A and 220B detect the electrical continuity (or discontinuity) of their respective plates 204A and 204B, respectively, and communicate the same to processor/controller 222. For example, an electrical current or signal transmitted by sensor 220A may be received by sensor 220B (or vice versa) as a result of the knife 201 being in electrical contact with both plates 204A and 204B. This would be viewed as a disturbance or abnormality by processor/controller 222. Processor/controller 222 can communicate the disturbance or abnormality to the user of the combine via a display in the cab 22 of the combine, for example. Continuity sensors 220A and 220B may be substituted with a different type of sensor (e.g., impact sensor, strain sensor, pressure sensor, acoustic sensor, photodetector, circuit, etc.) that is capable of detecting when a knife or other foreign object has become embedded in one or more of the plates.

It is to be understood that the operational steps are performed by the processor/controller 222 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 222 described herein is implemented in software code or instructions which are tangibly stored on a tangible computer readable medium. Upon loading and executing such software code or instructions by the controller 222, the controller 222 may perform any of the functionality of the controller 222 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A protective plate assembly useable with an agricultural vehicle, the protective plate assembly comprising:
- a first plate composed of a conductive material and that protects a component of the agricultural vehicle from being struck by a foreign object;
- a second plate composed of a conductive material and that protects the component of the agricultural vehicle from being struck by the foreign object, the second plate being spaced apart from the first plate;
- an insulator positioned between the first and second plates; and
- a first continuity sensor electrically connected to the first plate.

2. The protective plate assembly of claim 1, wherein the first and second plates are composed of steel.

3. The protective plate assembly of claim 1, further comprising a second continuity sensor electrically connected to the second plate.

4. The protective plate assembly of claim 3, further comprising a processor electrically connected to the first and second continuity sensors,
- wherein the processor determines whether there exists a lack of continuity in either the first or second plates due to a foreign object being embedded within one of the first or second plates based upon signals transmitted to the processor by the first and second continuity sensors.

5. The protective plate assembly of claim 1, wherein the insulator is sandwiched between the first and second plates.

6. The protective plate assembly of claim 1, wherein the insulator is composed of a plastic sheet or foam.

7. An agricultural vehicle comprising a protective plate assembly, the protective plate assembly comprising:
- a first plate composed of a conductive material and that protects a component of the agricultural vehicle from being struck by a foreign object;
- a second plate composed of a conductive material and that protects the component of the agricultural vehicle from being struck by the foreign object, the second plate being spaced apart from the first plate;
- an insulator positioned between the first and second plates; and
- a first continuity sensor electrically connected to the first plate.

8. The agricultural vehicle of claim 7, wherein the agricultural vehicle further comprises:
- a rotor comprising either knives or blades attached thereto; and
- an engine located adjacent to the rotor;
- wherein the protective plate assembly is positioned between the rotor and the engine.

9. The agricultural vehicle of claim 8, wherein the rotor forms part of either a chopper, a beater, a mill, or a spreader.

10. The agricultural vehicle of claim 7, wherein the agricultural vehicle further comprises:
- a rotor having knives attached thereto; and
- a fuel tank located adjacent to the rotor;
- wherein the protective plate assembly is positioned between the rotor and the fuel tank.

11. The agricultural vehicle of claim 7, wherein the agricultural vehicle further comprises:
- a rotor having knives attached thereto; and
- a grain tank located adjacent to the rotor;
- wherein the protective plate assembly is positioned between the rotor and the grain tank.

12. The agricultural vehicle of claim 7, wherein the agricultural vehicle further comprises:
- a rotor having knives attached thereto; and
- an engine oil reservoir located adjacent to the rotor;
- wherein the protective plate assembly is positioned between the rotor and the engine oil reservoir.

* * * * *